United States Patent [19]

Takano

[11] Patent Number: 5,768,281
[45] Date of Patent: Jun. 16, 1998

[54] ANCILLARY DATA PROCESSING CIRCUIT FOR AUDIO DECODING SYSTEM

[75] Inventor: Hideto Takano, Tokyo, Japan

[73] Assignee: NEC Corporation, Tokyo, Japan

[21] Appl. No.: 633,193

[22] Filed: Apr. 16, 1996

[30] Foreign Application Priority Data

Apr. 20, 1995 [JP] Japan .................................. 7-095255

[51] Int. Cl.$^6$ .......................... H04L 13/00; H03K 11/00
[52] U.S. Cl. .......................... 370/503; 370/509; 348/384; 348/423
[58] Field of Search .......................... 370/503, 509; 348/384, 423

[56] References Cited

U.S. PATENT DOCUMENTS 5,661,728  8/1997  Finotello et al. .................. 370/503

OTHER PUBLICATIONS

Recommendation ISO/IEC–11172–3 (1993), pp. 14–25.

*Primary Examiner*—Melvin Marcelo
*Attorney, Agent, or Firm*—Whitham, Curtis & Whitham

[57] ABSTRACT

The invention provides an ancillary data processing circuit wherein a bit train of ancillary data having a varying data length is converted into another bit train in units of a byte of a rearwardly packed form to make changing of byte boundaries in following processing unnecessary. The ancillary data processing circuit includes a clock masking circuit including a first 3-bit counter which is reset to zero by a synchronism detection signal and counts a first clock signal, a second 3-bit counter which receives the count value of the first counter as a preset value thereof in response to an ancillary data start signal and counts down a second clock signal, a flip-flop which is initialized in response to the ancillary data start signal, reverses the level thereof in response to an overflow signal of the second counter and outputs a masking signal, and a masking circuit which calculates a combination logic of the masking signal and the second clock signal and outputs the second clock signal or the zero level as a third clock signal in response to the level of the masking signal, and an OR circuit which outputs a result of logical ORing of the first and third clock signals as a read clock signal.

11 Claims, 10 Drawing Sheets

ANCILLARY DATA PROCESSING CIRCUIT FOR AUDIO DECODING SYSTEM

BACKGROUND OF THE INVENTION

1. Field of the Invention

This invention relates to an ancillary data processing circuit for an audio decoding system, and more particularly to an ancillary data processing circuit which converts a bit train of data of a variable data length such as ancillary data of the MPEG/audio system into another bit train of 8 bits.

2. Description of the Related Art

The draft international standard by the MPEG (Moving Picture Expert Group) investigated for standardization by the ISO/IEC, JTC1/SC2/WG8 is known as a coding system for an audio signal of a television system or the like. The MPEG (hereinafter referred to as MPEG audio system) standard specified by the Recommendation ISO/IEC-11172-3 (1993), which is one of standards of the draft internal standard, specifies an ancillary data processing circuit for bit stream data according to a compression-decompression system for a coded audio signal.

For the convenience of description, the prior art according to the layer II system from among the three layer I, II and III systems prescribed for the MPEG audio system is described as an example.

In the MPEG audio layer II system, a digital audio signal is divided into 32 frequency bands using a filter, and the quantization bit number of an output signal of the filter is adaptively varied in accordance with the value of the digital audio signal to compress the information in amount.

The bit number N for one frame of the MPEG audio layer II system is defined from the values of the bit rate R and the sampling frequency F in accordance with the following equation:

$$N = 1,152 R/F$$

Also it is defined that the bit number N is an integral multiple of 8. As an example, where the bit rate R is 192 kbps and the sampling frequency F is 48 kHz, the bit number N for one frame is 4,608 (=8×576).

Referring to FIG. 5 which shows a construction of a frame of the MPEG audio layer II system, the frame includes header information, a cyclic redundancy check (CRC) code, a bit allocation index, scale factor selection information, a scale factor index, samples of an audio signal and ancillary data.

Of the factors of the frame, the header information always has the length of 32 bits. The bit allocation index includes codes of 4 to 2 bits which are allocated to samples of the 32 frequency bands and has the length of 88 bits allocated per one channel. The bit numbers of the other factors of the frame vary depending upon the characteristic of the audio signal to be compressed. Further, the header information includes a CRC flag bit which indicates presence or absence of a CRC code, and where a CRC is present, 16 bits are added for the CRC code. The scale factor index allocates one of 6, 12 and 18 bits to each frequency band where the bit allocation to each frequency band sample is not zero. The scale factor information represents which one of the above three different numbers of bits the scale factor index is. When the bit allocation index to each band is not zero, a sample is formed from the number of bits indicated by the bit allocation index. The remainder when the bit numbers used by the factors described above are subtracted from the total bit number N of one frame is the bit number A of the ancillary data. The bit number A of the ancillary data is not limited to a multiple of 8, and besides exhibits a variation among different frames.

The contents of the ancillary data are not specifically defined in the MPEG audio standard. Therefore, by defining the standard of the ancillary data for individual application fields, various digital information such as, for example, character information, computer programs, error correction codes of an MPEG audio bit stream and so forth can be sent.

For example, as an example of a standard for character information transfer, such standard that the top 8 bits of the ancillary data represent the number of characters of character information and a succeeding ancillary data train represents one character per one byte while the remaining ancillary data train has no meaning may be used.

FIG. 6 shows in block diagram a conventional ancillary data processing circuit for character data transfer in which ancillary data of the MPEG audio system of the type described above are used. Referring to FIG. 6, the ancillary data processing circuit shown includes a decompression circuit 1 for decoding an MPEG audio code supplied thereto from an external storage medium or the like (hereinafter referred to as external apparatus) and outputting an audio signal and ancillary data, a character output control circuit 2 for outputting character data DC in accordance with the ancillary data standard in response to ancillary data DA supplied thereto, and a display apparatus 3 for displaying a character or characters in response to the character data DC supplied thereto.

The decompression circuit 1 includes a synchronism detection circuit 11, a signal processing circuit 12, an unpacking circuit 13, an ancillary data interface 14 and an OR circuit 15. The synchronism detection circuit 11 extracts a synchronous position from a bit stream B of MPEG audio codes whose value varies at the time of a falling edge of a read clock signal CR for reading out MPEG audio codes from the external apparatus and extracts a synchronism detection signal S. The signal processing circuit 12 performs decompression processing in accordance with compression audio information P and outputs an audio signal AF. The unpacking circuit 13 generates a clock signal CK, and separates from a bit stream B and outputs, in response to the synchronism detection signal S, compression audio information P such as a header, a CRC code, a bit allocation index, scale factor selection information, a scale factor index and samples and an ancillary data start signal SA. The ancillary data interface 14 outputs, in response to the ancillary data start signal SA supplied thereto, a strobe signal SS of ancillary data, a clock signal CD for ancillary data and a reading clock signal CP. The OR circuit 15 logically ORs the clock signal CK and the clock signal CP and outputs a result of the ORing as a read clock signal CR.

The construction of the ancillary data interface 14 is shown in FIG. 7. Referring to FIG. 7, the ancillary data interface 14 shown includes an RS flip-flop 41 which receives the synchronism detection signal S and the ancillary data start signal SA at an input terminal S and the other input terminal R thereof, respectively, and outputs a strobe signal SS from an output terminal Q thereof, a clock generation circuit 42 for outputting a clock signal CD for ancillary data in response to the strobe signal SS supplied thereto, and a clock generation circuit 43 for outputting a clock signal CP in response to the strobe signal SS supplied thereto.

Operation of the conventional ancillary data processing circuit, particularly operation of the ancillary data interface 14 and the character output control circuit 2, will be described below with reference to FIGS. 6 and 7 as well as FIG. 8 which illustrates in time chart signal waveforms of the ancillary data processing circuit. First, the synchronism detection circuit 11 detects a synchronous position from a bit stream B and supplies a synchronism detection signal S to the unpacking circuit 13 and the ancillary data interface 14. The unpacking circuit 13 outputs a clock signal CK and starts unpacking processing in response to the synchronism detection signal S supplied thereto. The unpacking circuit 13 thus extracts compression audio signal P such as a header, a CRC code, a bit allocation index, scale factor information, a scale factor index and samples from the bit stream B supplied thereto and supplies the thus extracted compression audio information P to the signal processing circuit 12. The signal processing circuit 12 processes in accordance with the contents of the compression audio information P supplied thereto and outputs an audio signal AF. The ancillary data interface 14 outputs a strobe signal SS, a clock signal CD and a clock signal CP in response to an ancillary data start signal SA supplied thereto. The OR circuit 15 outputs a logical OR signal of the clock signal CK and the clock signal CP as a read clock signal CR to the external apparatus. The character output control circuit 2 receives ancillary data DA supplied thereto and outputs character data DC to the display apparatus 3 in accordance with the ancillary data standard mentioned hereinabove. The display apparatus 3 displays a character or characters in accordance with the character data DC supplied thereto.

The flip-flop 41 of the ancillary data interface 14 outputs the level "1" of the strobe signal SS first in its initial state. Then, in response to the ancillary data start signal SA supplied thereto, the ancillary data interface 14 changes the strobe signal SS to the level "0", but changes the strobe signal SS back to the level "1" in response to a next synchronism detection signal S supplied thereto. When the strobe signal SS is at the level "0", the clock generation circuit 42 and the clock generation circuit 43 output a clock signal CD and a clock signal CP, respectively.

The character output control circuit 2 is formed using, for example, a microprocessor. The character output control circuit 2 converts the ancillary data DA from serial data to parallel data at a rising edge of the clock signal CD in response to the level "0" of the ancillary data strobe signal SS and transfers the resulting data as a parallel character data train for each 8 bits to a built-in memory (not shown) thereof. If the ancillary data DA to be converted has less than 8 bits when the ancillary data strobe signal SS changes to the level "1", the ancillary data DA is stuffed or shifted, for example, toward the lowermost bit and then transferred to the memory, thereby ending the fetching processing for the ancillary data DA. Thereafter, the character data train fetched in the memory is supplied to and displayed on the display apparatus 3. In this manner, the ancillary data in which information of a character number, a character, a character, . . . successively appear can be decoded and displayed for each 8 bits beginning with the top of the ancillary data in this manner.

Meanwhile, as a method of transferring character information in ancillary data, there is a method called "rearward packing" wherein the last 8 bits of ancillary data represent a number of characters of character information and each one byte (8 bits) preceding to the last 8 bits represents a character. The conventional ancillary data processing circuit described above cannot employ the rearward packing method. The reason is that, although character data are represented by a byte or bytes, that is, by a number of bits which is a multiple of 8, the number of bits of ancillary data of each frame is not always equal to a multiple of 8 and there is the possibility that ancillary data to which the character information transfer method is applied may include, at a top portion thereof, unnecessary data of less than 8 bits different from any character data. When such ancillary data are supplied to the conventional ancillary data processing circuit, although the character output control circuit 2 is required to detect the number of characters from data of the last one byte, where the bit number of ancillary data is not a multiple of 8, it cannot be discriminated bits of the data up to which bit of the last 8 bits represent effective data. Consequently, a character or characters cannot be displayed correctly.

Conventionally, in order to discriminate ancillary data to which such a rearwardly packed character information transfer method as described above is applied, a byte boundary conversion circuit is required which detects a number of effective bits in ancillary data and changes each boundary between bytes of the ancillary data.

FIG. 9 shows in block diagram another conventional ancillary data processing circuit. Referring to FIG. 9, similar reference numerals denote similar elements to those of FIG. 6. The second conventional ancillary data processing circuit of FIG. 9 is different from the first described conventional ancillary data processing circuit of FIG. 6 in that it additionally includes a byte boundary changing circuit 5 which receives ancillary data DA, a strobe signal SS and a clock signal CD supplied thereto from the decompression circuit 1, changes byte boundaries of the ancillary data DA in response to the strobe signal SS and the clock signal CD to obtain changed ancillary data AC and outputs the changed ancillary data AC.

Referring now to FIG. 10, the byte boundary changing circuit 5 includes a serial to parallel conversion circuit 51 which converts the ancillary data DA from serial data into parallel data in response to the clock signal CD supplied thereto and outputting parallel ancillary data DP of 8 bits, a memory 52 for storing the parallel ancillary data DP, a counter 53 which is reset by a falling edge (front edge) of the ancillary data strobe signal SS, counts clocks of the clock signal CD and outputs the count value N, a control circuit 54 for selectively outputting a write signal SW or a read signal SR to control writing into and reading out from the memory 52 in response to the level of the strobe signal SS, and a shifter 55 for shifting read data RD of the memory 52 in accordance with the value of lower 3 bits of the count value N and outputting resulting changed ancillary data AC.

In operation, the serial to parallel conversion circuit 51 converts the ancillary data DA inputted thereto from series data into parallel data for each 8 bits in response to the clock signal CD supplied thereto and stores resulting parallel ancillary data of 8 bits into memory 52. The memory 52 must have a storage capacity sufficient to store ancillary data of a maximum bit number for one frame. The counter 53 calculates the number of clocks of the clock signal CD supplied thereto and outputs its count value N. The counter 53 is reset at a falling front edge of the strobe signal SS to return the count value N to "0". The control circuit 54 outputs, when the level of the strobe signal SS is "0", a write signal SW each time the serial to parallel conversion circuit 51 outputs one byte. On the other hand, when the strobe signal SS changes to the level "1", if the ancillary data DA remains in the serial to parallel conversion circuit 51, then the bits of the ancillary data DA are stuffed or shifted toward the uppermost bit, and "0" is placed into each of missing bits of the thus shifted ancillary data DA. Then, resulting data is stored into the memory 52. Thereafter, the control circuit 54 outputs a write signal SW. Thereafter, in order to read out the data of the bit number indicated by the count value N, the control circuit 54 outputs a read signal SR for each one byte. The shifter 55 shifts the data RD read out from the memory 52 in accordance with the value of the lower 3 bits of the count value N to obtain changed ancillary data AC which byte boundaries have been changed in units of 8 bits. The shifter 55 outputs the thus obtained changed ancillary data AC.

As an example, if the bit number of the ancillary data DA is 13, then the value of the lower 3 bits of the count value N is 3. In particular, since the number of bits of one frame is a multiple of 8 bits as described hereinabove, the remainder of modulo 8 of 8n−13 is 3 (n is an arbitrary integer). If the ancillary data DA inputted to the byte boundary changing circuit 5 is b0, . . . , b12 as seen in FIG. 8, then the lower bits b0, . . . , b7 of the ancillary data DA are inputted to the shifter 55 in response to a first read signal SR. The shifter 55 shifts those bits by 3 bits toward the uppermost bit, that is, toward the bit 7 and outputs the 8 bits of 0, 0, 0, b0, . . . , b4 as changed ancillary data AC. The remaining lower bits b5, b6 and b7 of the ancillary data DA remain stored in the shifter 55. Since the upper bits b8, . . . , b12, 0, 0, 0 of the ancillary data DA are inputted to the shifter 55 in response to the next read signal SR, the shifter 55 shifts them by 3 bits toward the lowermost bit, places the bits b5, b6 and b7 stored in the shifter 55 into the upper 3 bits, and outputs resulting bits as changed ancillary data AC. By the processing described above, the byte boundary changing circuit 5 converts the ancillary data DA into the rearwardly packed changed ancillary data AC of a bit number of a multiple of 8.

The conventional data processing circuit described first hereinabove is disadvantageous in that it cannot be applied to a rearwardly packed character information transfer method wherein the last 8 bits of ancillary data represent the number of characters of character information and the ancillary data represent one character for each one byte (8 bits) preceding to the last 8 bits.

The second described conventional ancillary data processing circuit which can be applied to the rearwardly packed character information transfer method is disadvantageous in that, since it requires a byte boundary changing circuit for changing the byte boundary of rearwardly packed information in units of one byte, a large circuit scale is required, which makes a factor of an increase in cost.

SUMMARY OF THE INVENTION

It is an object of the present invention to provide an ancillary data processing circuit which can achieve reduction in circuit scale and cost without requiring a byte boundary changing circuit.

In order to attain the object described above, according to the present invention, there is provided an ancillary data processing circuit, which comprises a circuit for generating a read clock signal for reading out, from an external signal source, a bit stream whose one frame includes a second number of bits equal to an integral multiple of a first number (for example, 8) determined in advance and which includes header information and audio information as main information which include a third number of bits and ancillary data following the header information and audio information and including a fourth number of bits which is equal to a difference between the third and second numbers, a synchronism detection circuit for detecting the top of the bit stream in response to the read clock signal supplied thereto and outputting a synchronism detection signal, and ancillary data extraction means for extracting the ancillary data from the bit stream in response to the synchronism detection signal supplied thereto, generating an ancillary data clock signal for synchronization of the ancillary data and outputting the ancillary data and the ancillary data clock signal to be outputted from the ancillary data processing circuit, the ancillary data extraction means including dummy clock addition means for calculating the fourth number from a number of bits from the top of the bit stream to a start position of the ancillary data and adding to the ancillary data clock signal a fifth number of dummy clocks which is equal to a difference between the first number and a remainder when the fourth number is divided by the first number.

In the ancillary data processing circuit, the ancillary data extraction means adds dummy clocks for addition of dummy data to the ancillary data clock signal to change byte boundaries of the ancillary data so that the ancillary data may end at a predetermined byte boundary. Consequently, the necessity for a byte boundary changing circuit is eliminated.

The ancillary data extraction means may further include an unpacking circuit for generating a first read clock signal in response to the synchronism detection signal supplied thereto to extract audio information from the bit stream, detecting an end position of the audio information and outputting an ancillary data start signal, and stopping the first clock signal, and an ancillary data clock generation circuit for being initialized in response to the synchronism detection signal supplied thereto and generating a second read clock signal and the ancillary data clock signal in response to the ancillary data start signal supplied thereto, and the dummy clock addition means may include a clock masking circuit including a first counter having a maximum count value equal to the first number for being initialized in response to the synchronism detection signal supplied thereto and for counting the first read clock signal and outputting a first count value, a second counter having a maximum count value equal to the first number for being initialized to the first count value in response to the ancillary data start signal supplied thereto and counting down the second read clock signal, a flip-flop circuit for being initialized in response to the ancillary data start signal supplied thereto and for alternately reversing a state thereof between the true and the false in response to an overflow signal of the second counter and outputting a masking signal, and a masking circuit for calculating a combination logic between the masking signal and the second read clock signal and outputting one of the second read clock signal and an inactive level as a third read clock signal in response to the true or the false of a result of the calculation of the combination logic, and a logical OR circuit for logically ORing the first read clock signal and the third read clock signal and outputting a result of the logical ORing as a read clock signal.

Preferably, the dummy clock addition means further includes a selection circuit for selecting one of the second read clock signal and the third read clock signal and outputting the selected read clock signal as a selection read clock signal, and the logical OR circuit outputs a result of logical ORing of the first read clock signal and the selection read clock signal.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
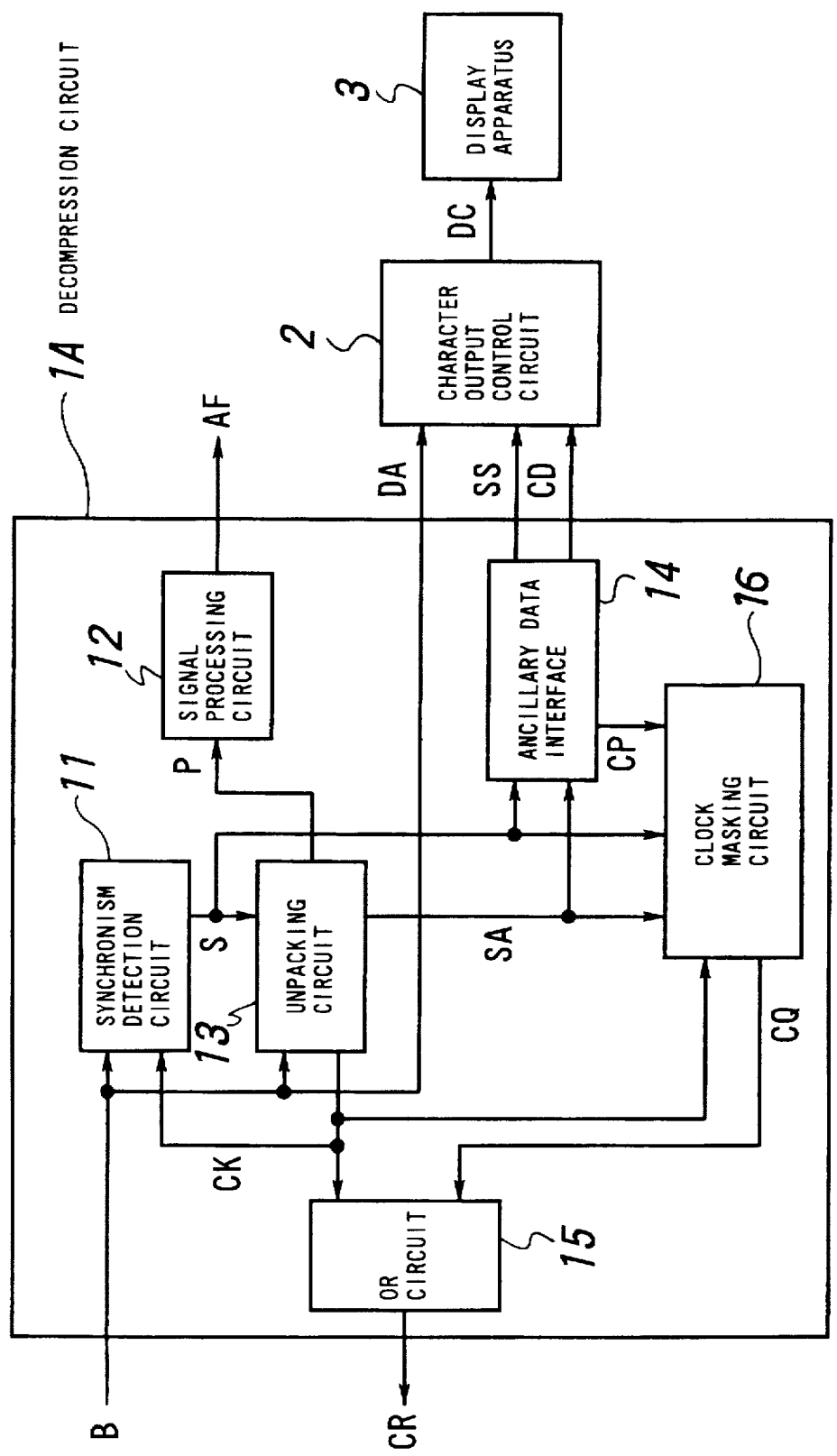
FIG. 1 is a block diagram of an ancillary data processing circuit to which the present invention is applied.

FIG. 1 shows in block diagram of an ancillary data processing circuit to which the present invention is applied. Referring to FIG. 1, the ancillary data processing circuit shown is an improvement to the conventional ancillary data processing circuit described hereinabove with reference to FIG. 6. The present ancillary data processing circuit includes a character output control circuit 2 and a display apparatus 3 similar to those of the ancillary data processing circuit of FIG. 6 and further includes, in place of the decompression circuit 1 of the ancillary data processing circuit of FIG. 6, a decompression circuit 1A which includes, in addition to a synchronism detection circuit 11, a signal processing circuit 12, an unpacking circuit 13, an ancillary data interface 14 and an OR circuit 15 similar those of the decompression circuit 1, a clock masking circuit 16 which masks a clock signal CP for a preset period as counted by a number of pulses of a clock signal CK after the time at which a synchronism detection signal S is inputted and outputs a resulted signal as a clock signal CQ to the OR circuit 15.

In operation, the synchronism detection circuit 11 outputs a synchronism detection signal S detected from a bit stream B similarly as in the conventional ancillary data processing circuit. The unpacking circuit 13 outputs a clock signal CK and extracts compression audio information P from the bit stream B in response to the synchronism detection signal S supplied thereto. The unpacking circuit 13 outputs the thus extracted compression audio information P to the signal processing circuit 12. The signal processing circuit 12 processes the compression audio information P and outputs an audio signal AF. The ancillary data interface 14 outputs a strobe signal SS, a clock signal CD and another clock signal CP in response to an ancillary data start signal SA supplied thereto from the unpacking circuit 13.

The clock masking circuit 16 masks the clock signal CP and outputs a clock signal CQ for a period of time defined by a number of pulses of the clock signal CK after the time at which the synchronism detection signal S is inputted thereto. The OR circuit 15 logically ORs the clock signal CK and the clock signal CQ and outputs a result of the ORing as a read clock signal CR. The character output control circuit 2 receives ancillary data DA supplied thereto and outputs character data DC to the display apparatus 3. The display apparatus 3 displays a character or characters in accordance with the character data DC.

Figure 2:
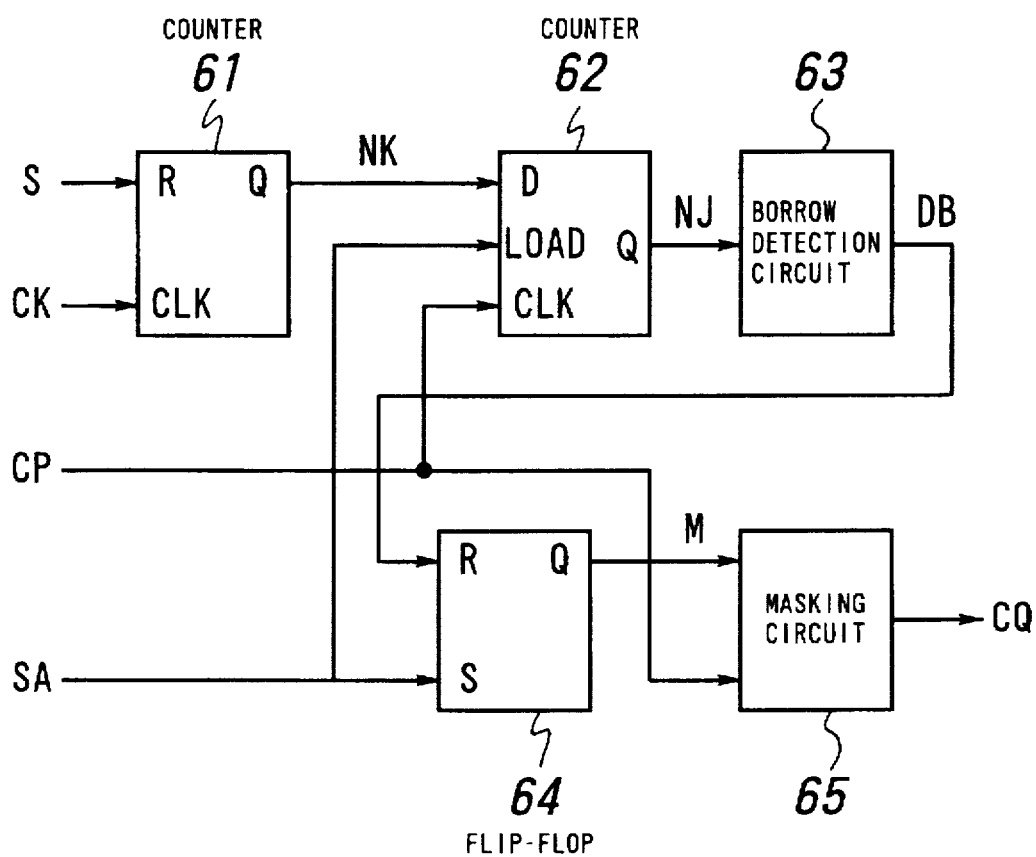
FIG. 2 is a block diagram showing a construction of a clock masking circuit of the ancillary data processing circuit of FIG. 1.

FIG. 2 shows in block diagram a construction of the clock masking circuit 16. Referring to FIG. 2, the clock masking circuit 16 includes a counter 61 of 3 bits which is reset to zero by the synchronism detection signal S, counts the number of clocks of the clock signal CK and outputs a count value NK, a counter 62 which receives the count value NK as a preset value NK in response to the ancillary data start signal SA supplied thereto, decrements the count value thereof in response to the clock signal CP and outputs the count value NJ thereof which changes, when decremented from 0, to 7, a borrow detection circuit 63 which outputs a borrow detection signal DB when the count value NJ changes to 7, an RS flip-flop 64 which sets a masking signal M in response to the ancillary data start signal SA supplied thereto and resets the masking signal M in response to the borrow detection signal DB supplied thereto, and a masking circuit 65 which compulsorily suppresses the clock signal CP to zero and outputs a clock signal CQ while the masking signal M is in a set state.

Figure 3:
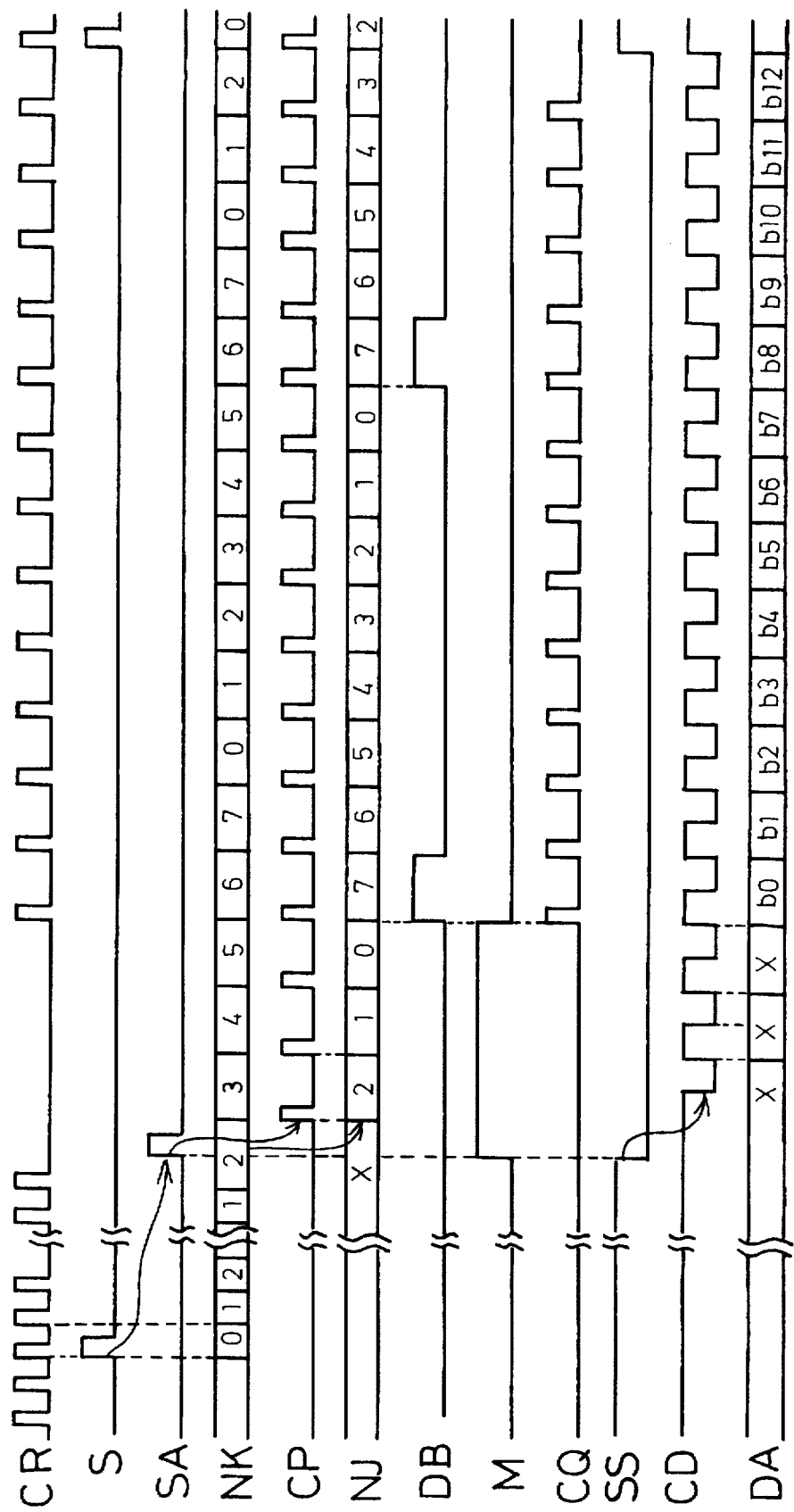
FIG. 3 is a time chart illustrating exemplary operation of the ancillary data processing circuit of FIG. 1.

Operation of the clock masking circuit 16 will be described below with reference to FIG. 2 and the time chart of FIG. 3. It is to be noted that, for the convenience of description, FIG. 3 shows signal waveforms when the number of bits of the ancillary data DA is 13. The clock masking circuit 16 detects, from the count value of the counter 61 when the ancillary data start signal SA is inputted, that is, the preset value NK for the counter 62, a shortage number of the bit number of the ancillary data DA from a multiple of 8. During the operation, the clock masking circuit 16 masks the clock signal CP to zero and outputs a clock signal CQ. Since the level of the read clock signal CR which is used to read an external apparatus is 0, supply of the bit stream is stopped. However, since the clock signal CD for ancillary data is outputted, the number of clocks of the clock signal CD is a multiple of 8. In other words, if the count value NK is m, then this represents that the number of bits of the ancillary data DA is short by m+1 from a multiple of 8. For example, when the bit number of the ancillary data DA is equal to (a multiple of 8)+5, since the shortage mentioned above is 3, the preset value NK is 2. In this instance, the clock masking circuit 16 operates in the following manner.

First, the preset value NK=2 is placed into the counter 62 in response to the ancillary data start signal SA supplied thereto. The counter 62 decrements its count value NJ each time a clock signal CP is inputted thereto. Consequently, when the count value NJ is decremented three times, it changes to 7. During this operation, the masking circuit 65 compulsorily holds the clock signal CP to the level 0 and outputs a clock signal CQ. During the operation, supply of the bit stream B is stopped, but outputting of the clock signal CD and the ancillary data DA synchronized with the clock signal CD continues. As a result, the number of clocks of the clock signal CD becomes equal to a multiple of 8. In this instance, for the period of time of the first three clocks of the clock signal CD, the value of the ancillary data DA outputted remains equal. On the other hand, when the preset value NK is 7, the shortage mentioned above is 0, that is, the bit number of the ancillary data DA is a multiple of 8. Consequently, the clock signal CP is not masked but is outputted as it is as the clock signal CQ. In this instance, also the number of clocks of the clock signal CD is a multiple of 8 naturally.

As a result of the processing described above, the ancillary data DA supplied to the character output control circuit 2 are converted into rearwardly packed data wherein the first 8 bits are x, x, x, b0, b1, b2, b3, b4 and the next 8 bits are b5, b6, b7, b8, b9, b10, b11, b12. Here, x represents an undefined value. As a result, the 8 bits received last by the character output control circuit 2 have effective values without fail.

Figure 4:
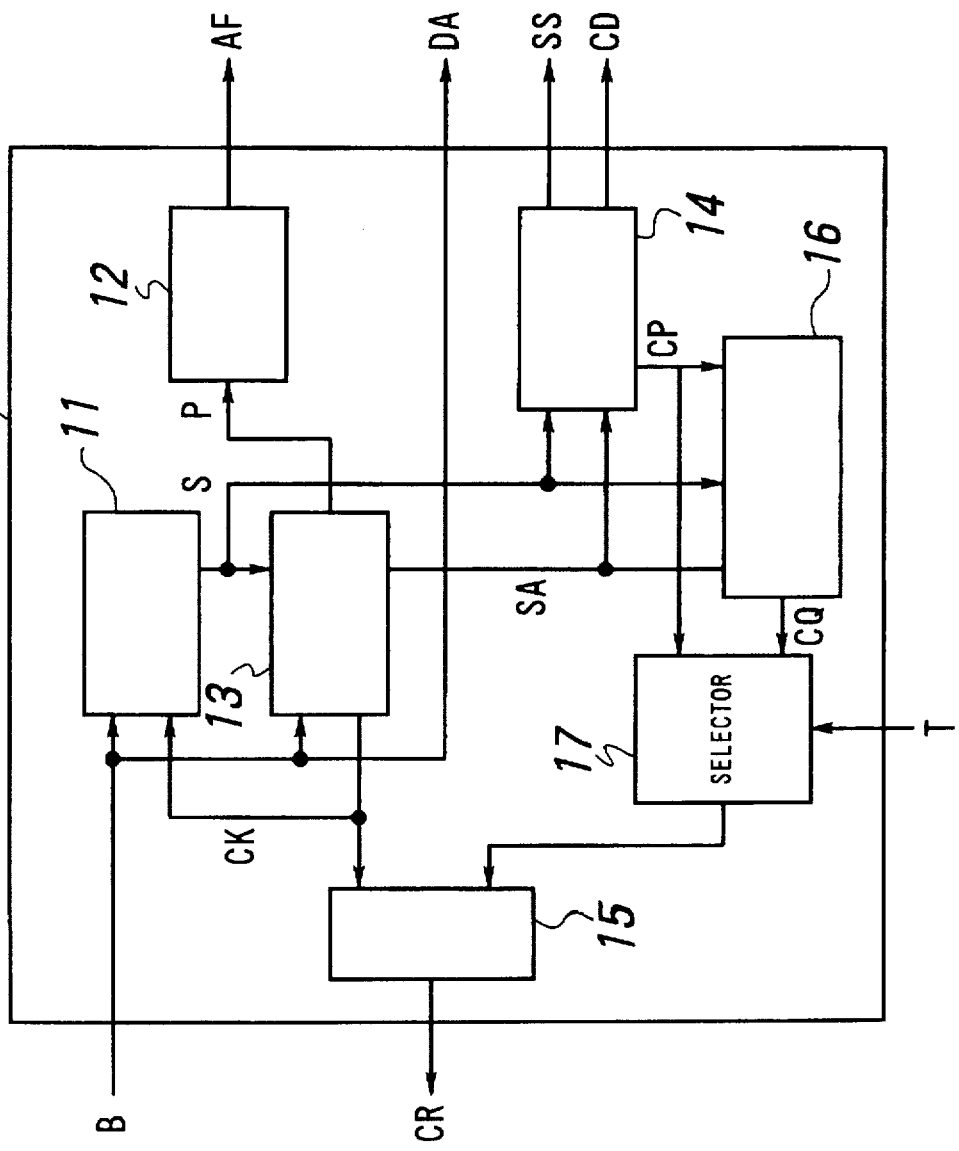
FIG. 4 is a block diagram of another ancillary data processing circuit which can be incorporated in the ancillary data processing circuit of FIG. 1.
Figure 5:
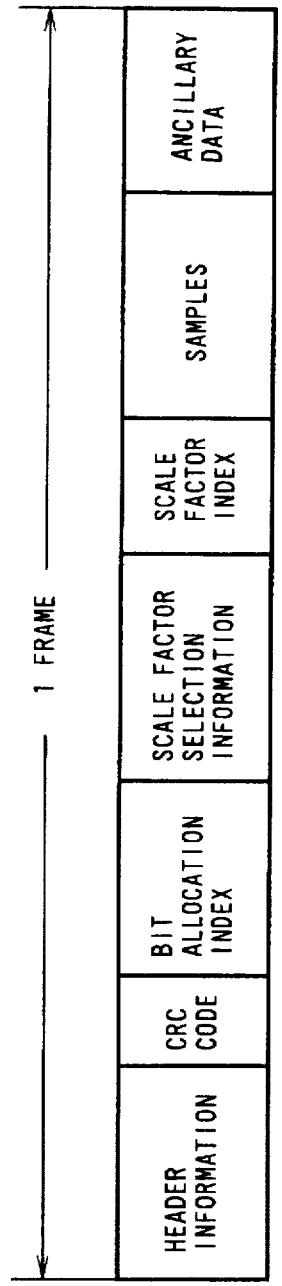
FIG. 5 is a diagrammatic view showing a format of a frame of the MPEG audio layer II system.

Referring now to FIG. 4, there is shown a modification to the decompression circuit 1A shown in FIG. 1. The modified decompression circuit shown is denoted at 1B and includes, in addition to the components of the decompression circuit 1A of FIG. 1, a selector 17 for selecting one of the clock signals CP and CQ in response to a selection signal T and supplying the selected clock signal as a clock signal CT in place of the clock signal CQ to the OR circuit 15.

Figure 6:
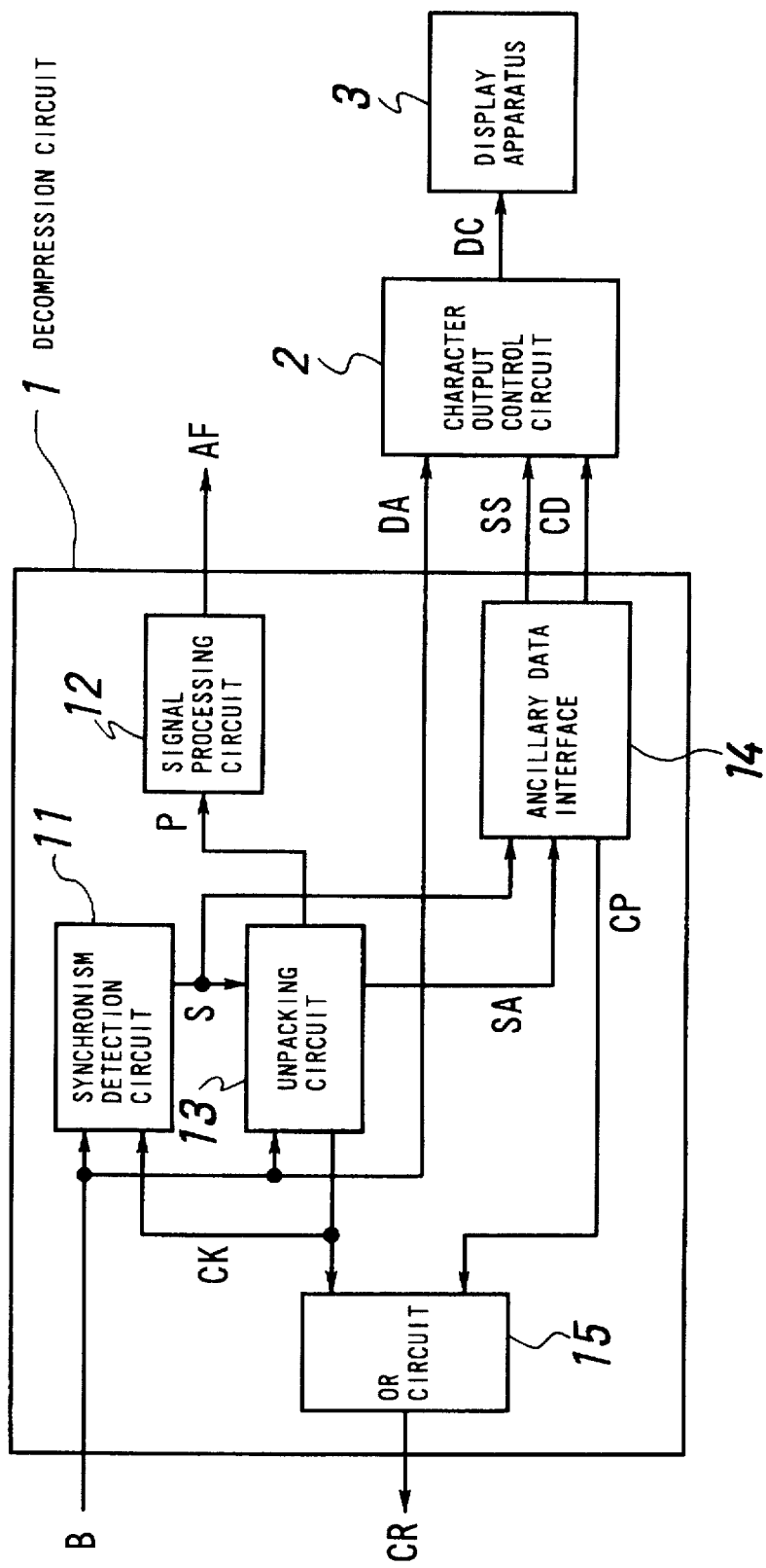
FIG. 6 is a block diagram showing a conventional ancillary data processing circuit.
Figure 7:
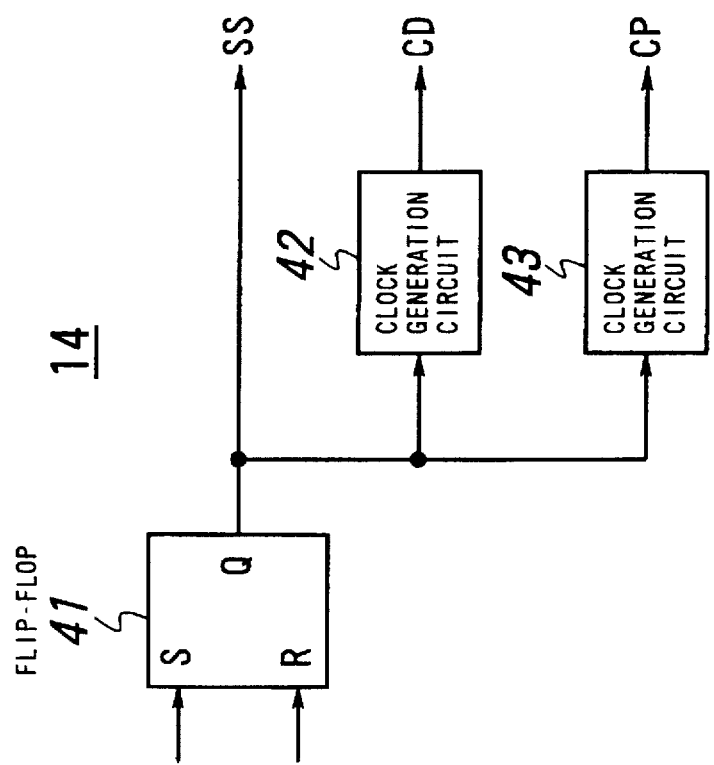
FIG. 7 is a block diagram showing a construction of an ancillary data interface of the ancillary data processing circuit of FIG. 6.
Figure 8:
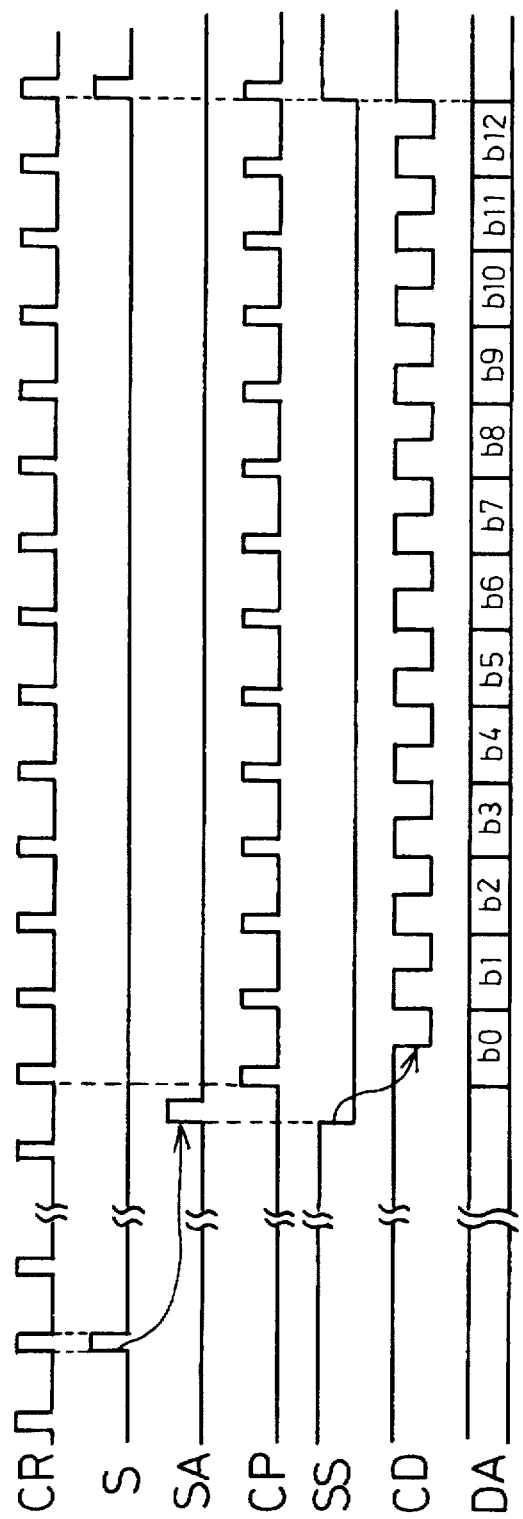
FIG. 8 is a time chart illustrating operation of the ancillary data processing circuit of FIG. 6.
Figure 9:
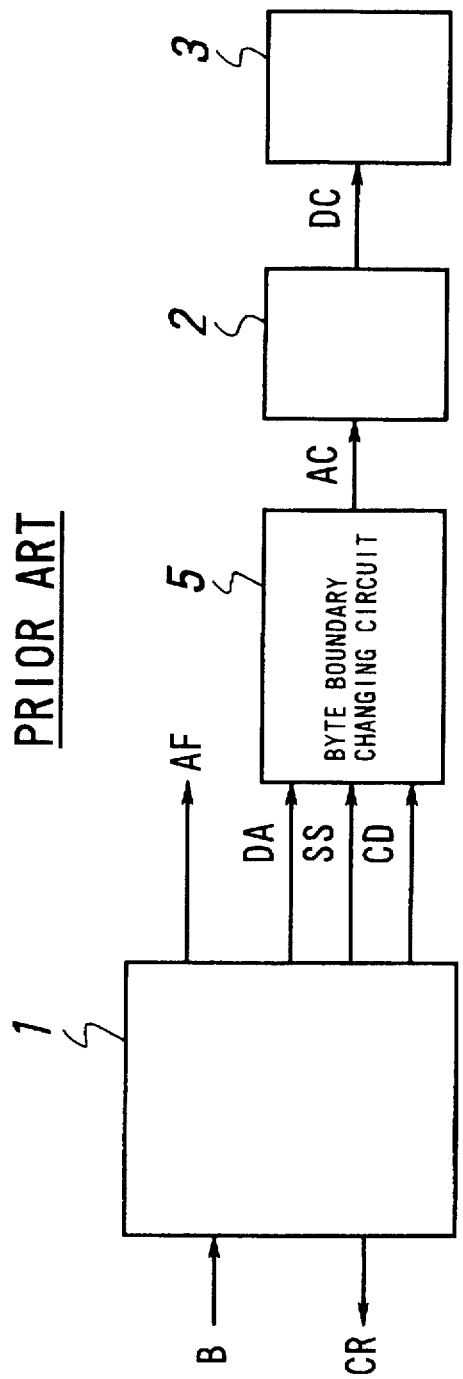
FIG. 9 is a block diagram showing another conventional ancillary data processing circuit.
Figure 10:
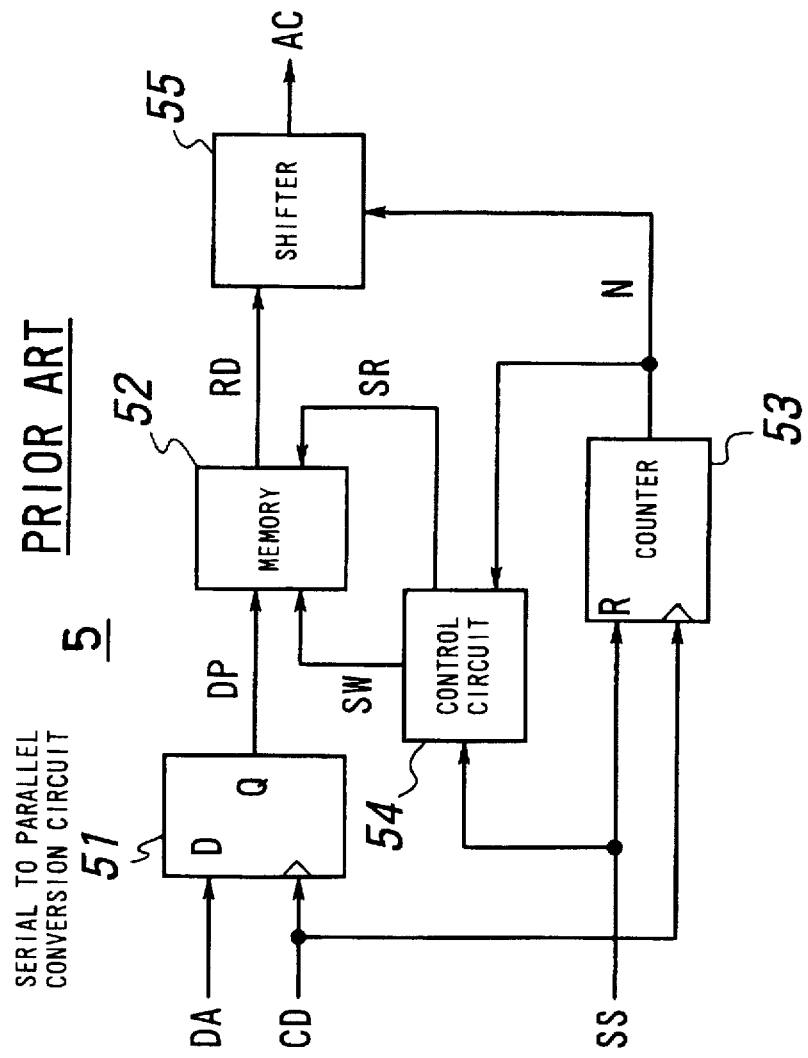
FIG. 10 is a block diagram showing a construction of a byte boundary changing circuit incorporated in the ancillary data processing circuit of FIG. 9.

Due to the provision of the selector 17, it can arbitrarily change over the operation of the ancillary data processing circuit between the operation of the ancillary data processing circuit of FIG. 1 and the operation of the conventional ancillary data processing circuit described hereinabove with reference to FIG. 6.

While the preferred embodiment of the present invention is described above, the present invention is not limited to the specific embodiment described above, but many changes and modifications can be made to the embodiment without departing from the spirit and scope of the invention as set forth herein. For example, the ancillary data need not be limited to character data, but may be numerical data, address data or some other data.

What is claimed is:

1. An ancillary data processing circuit, comprising:

a circuit for generating a read clock signal for reading out, from an external signal source, a bit stream whose one frame includes a second number of bits equal to an integral multiple of a first number determined in advance and which includes header information and audio information as main information which include a third number of bits and ancillary data following the header information and audio information and including a fourth number of bits which is equal to a difference between the second and third numbers;

a synchronism detection circuit for detecting the top of the bit stream in response to the read clock signal supplied thereto and outputting a synchronism detection signal; and ancillary data extraction means for extracting the ancillary data from the bit stream in response to the synchronism detection signal supplied thereto, generating an ancillary data clock signal for synchronization of the ancillary data and outputting the ancillary data and the ancillary data clock signal to be outputted from said ancillary data processing circuit, said ancillary data extraction means including dummy clock addition means for calculating the fourth number from a number of bits from the top of the bit stream to a start position of the ancillary data and adding to the ancillary data clock signal a fifth number of dummy clocks which is equal to a difference between the first number and a remainder when the fourth number is divided by the first number.

2. An ancillary data processing circuit as claimed in claim 1, wherein said ancillary data extraction means further includes an unpacking circuit for generating a first read clock signal in response to the synchronism detection signal supplied thereto to extract audio information from the bit stream, detecting an end position of the audio information and outputting an ancillary data start signal, and stopping the first clock signal, and an ancillary data clock generation circuit for being initialized in response to the synchronism detection signal supplied thereto and generating a second read clock signal and the ancillary data clock signal in response to the ancillary data start signal supplied thereto, and said dummy clock addition means includes a clock masking circuit including a first counter having a maximum count value equal to the first number for being initialized in response to the synchronism detection signal supplied thereto and for counting the first read clock signal and outputting a first count value, a second counter having a maximum count value equal to the first number for being initialized to the first count value in response to the ancillary data start signal supplied thereto and counting down the second read clock signal, a flip-flop circuit for being initialized in response to the ancillary data start signal supplied thereto and for alternately reversing a state thereof between the true and the false in response an overflow signal of said second counter and outputting a masking signal, and a masking circuit for calculating a combination logic between said masking signal and said second read clock signal and outputting one of said second read clock signal and an inactive level as a third read clock signal in response to the true or the false of a result of the calculation of the combination logic, and a logical OR circuit for logically ORing the first read clock signal and the third read clock signal and outputting a result of the logical ORing as a read clock signal.

3. An ancillary data processing circuit as claimed in claim 1, wherein the first number is 8.

4. An ancillary data processing circuit as claimed in claim 2, wherein said dummy clock addition means further includes a selection circuit for selecting one of the second read clock signal and the third read clock signal and outputting the selected read clock signal as a selection read clock signal, and said logical OR circuit outputs a result of logical ORing of the first read clock signal and the selection read clock signal.

5. A data processor, comprising:

a circuit for generating a read clock signal for reading out, from an external signal source, a bit stream whose one frame includes a second number of bits equal to an integral multiple of a first number determined in advance and which includes first information and second information as main information which include a third number of bits and ancillary data following the first information and second information and including a fourth number of bits which is equal to a difference between the second and third numbers;

a synchronism detector for detecting the top of the bit stream in response to the read clock signal supplied thereto and outputting a synchronism detection signal; and an ancillary data extractor for extracting the ancillary data from the bit stream in response to the synchronism detection signal supplied thereto, generating an ancillary data clock signal for synchronization of the ancillary data and outputting the ancillary data and the ancillary data clock signal to be outputted from said data processor, said ancillary data extractor including a dummy clock adder for calculating the fourth number from a number of bits from the top of the bit stream to a start position of the ancillary data.

6. A data processor according to claim 5, wherein said first information comprises header information and said second information comprises audio information.

7. A data processor according to claim 6, wherein said dummy clock adder adds to the ancillary data clock signal a fifth number of dummy clocks which is equal to a difference between the first number and a remainder when the fourth number is divided by the first number.

8. A data processor according to claim 7, wherein said ancillary data extractor further includes:

an unpacking circuit for generating a first read clock signal in response to the synchronism detection signal supplied thereto to extract audio information from the bit stream, detecting an end position of the audio information and outputting an ancillary data start signal, and stopping the first clock signal; and an ancillary data clock generator for being initialized in response to the synchronism detection signal supplied thereto, and generating a second read clock signal and the ancillary data clock signal in response to the ancillary data start signal supplied thereto.

9. A data processor according to claim 8, wherein said dummy clock adder includes a clock masking circuit, said clock masking circuit including:

a first counter having a maximum count value equal to the first number for being initialized in response to the synchronism detection signal supplied thereto and for counting the first read clock signal and outputting a first count value;

a second counter having a maximum count value equal to the first number for being initialized to the first count value in response to the ancillary data start signal supplied thereto and counting down the second read clock signal;

a flip-flop circuit for being initialized in response to the ancillary data start signal supplied thereto and for alternately reversing a state thereof between the true and the false in response to an overflow signal of said second counter and outputting a masking signal;

a masking circuit for calculating a combination logic between said masking signal and said second read clock signal and outputting one of said second read clock signal and an inactive level as a third read clock signal in response to the true or the false of a result of the calculation of the combination logic; and a logical OR circuit for logically ORing the first read clock signal and the third read clock signal and outputting a result of the logical ORing as a read clock signal.

10. A data processor according to claim 5, wherein the first number is 8.

11. A data processor according to claim 9, wherein said dummy clock adder further includes:

a selector for selecting one of the second read clock signal and the third read clock signal and for outputting the selected read clock signal as a selection read clock signal, wherein said logical OR circuit outputs a result of logical ORing of the first read clock signal and the selection read clock signal.

* * * * *